United States Patent Office 2,755,282
Patented July 17, 1956

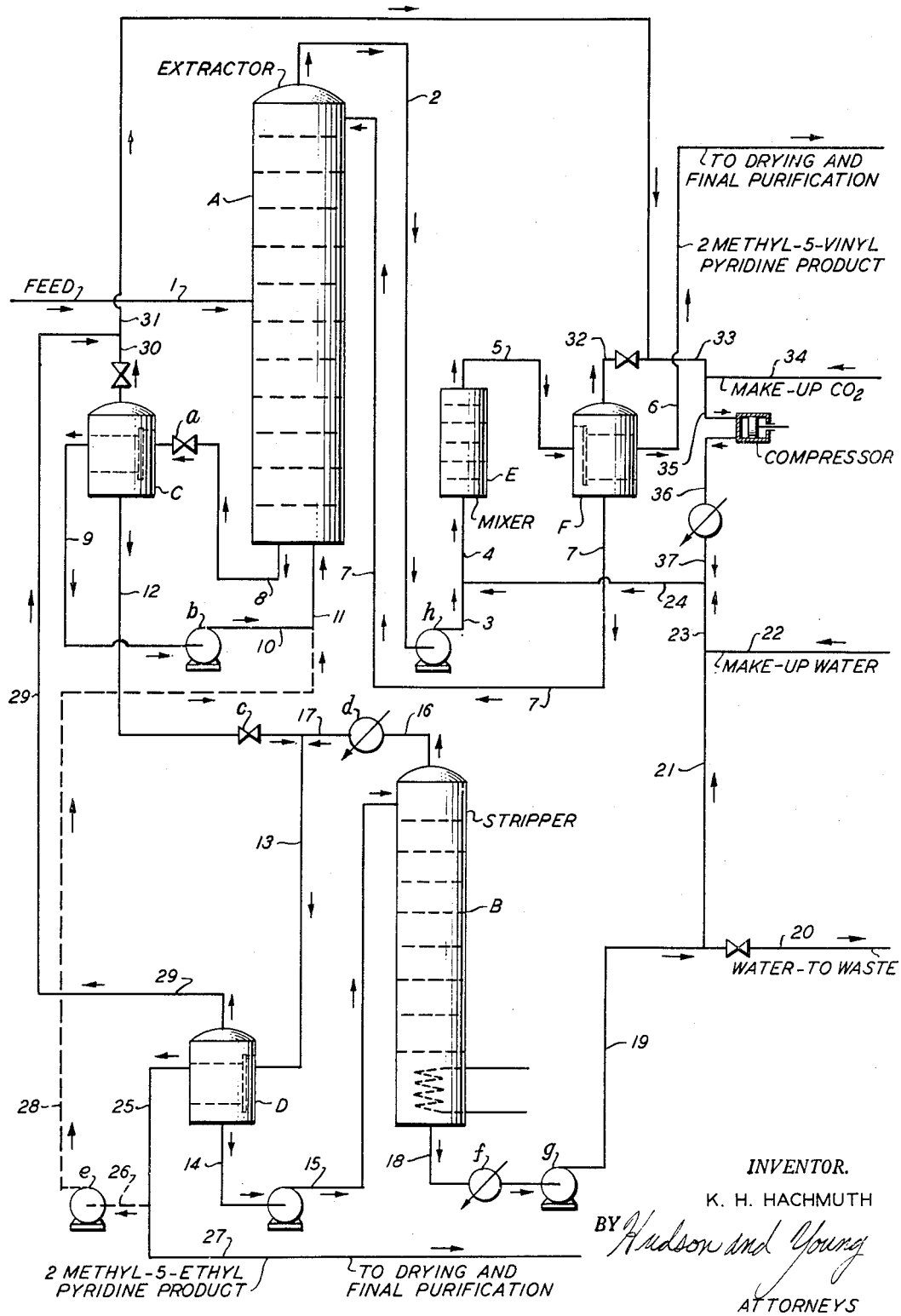

2,755,282
SEPARATION OF NITROGEN BASES

Karl H. Hachmuth, Bartlesville, Okla., assignor to Phillips Petroleum Company, a corporation of Delaware Application October 27, 1952, Serial No. 317,087

8 Claims. (Cl. 260—290)

This invention pertains to the separation of nitrogen bases of different basicity and in one aspect to the separation of heterocyclic compounds having hetero N-atoms, and which differ in basicity. In another of its aspects this invention relates to the separation of an alkenyl or alkinyl substituted pyridine compound by solvent extraction from a more basic pyridine compound.

This invention is particularly suited for the separation of vinylpyridine from ethylpyridine. It is known that difficulties are encountered in the manufacture of vinylpyridine compounds because of the tendency of these heterocyclic nitrogen compounds to polymerize upon exposure to elevated temperatures. Thus difficulty is generally encountered in purifying vinylpyridine compounds by distillation due to their susceptibility to the polymerization which results in the formation of polymer within the column. As a consequence it is necessary to operate at low temperatures under high vacuum, or to stabilize the vinylpyridines against polymerization, or to resort to other means of separation.

Acidic materials are good solvents for nitrogen bases, and therefore can be used to separate, by liquid extraction, two close boiling structurally similar nitrogen bases which differ in the degree of basicity, i. e. in their basic ionization constants. However, it is generally very difficult to separate completely the nitrogen base from the solvent in solvent recovery operations without at least partially neutralizing the acid. Since acid is consumed, neutralization is expensive, and generally neutralization is impractical for large scale operation.

In accordance with the present invention the difficulties due to neutralization are obviated by a method of operation which permits easy, efficient and economical adjustment of the solvent acidity as desired. By the practice of this invention an acidic solvent is employed wherein the acidity or acid forming compound can be easily and efficiently adjusted in concentrations by changing the pressure and/or temperature on the system. Thus by using lower temperatures and higher pressures the concentration of acid forming material may be increased in the solvent to a satisfactory amount for the extraction step of the process and by using higher temperatures and lower pressures the acid component may be easily and economically reduced in concentration so as to permit easy recovery of the organic product from the solvent. The acid solvent used in accordance with this invention is a solution of carbon dioxide in water. Since carbon dioxide and water on one hand and carbonic acid on the other will be in equilibrium the acidity of this solution may be increased by dissolving more carbon dioxide in the water, using higher pressures to cause the greater quantity of carbon dioxide to dissolve. By reducing the pressure, the carbon dioxide will leave the solution thus easily and conveniently reducing the acidity. Higher temperatures may be used to aid in removing carbon dioxide from the solution. Lower temperatures favor the solution of carbon dioxide. According to the instant invention, therefore, nitrogen bases having different pH values are separated by contacting the mixture of nitrogen bases with water having dissolved therein sufficient carbon dioxide to form a non-aqueous, or raffinate phase, richer in the less basic nitrogen base on a solvent-free basis than the initial mixture and an aqueous extract phase richer in the more basic nitrogen base on a solvent-free basis than the initial mixture. The non-aqueous layer, or raffinate phase, is recovered and separated from solvent; the carbon dioxide is liberated from the extract phase to cause the formation of organic and aqueous phases. The organic phase, richer than the initial mixtures in the more basic nitrogen base can then be recovered.

The separation of solvent from nitrogen bases in the extract is easily made in accordance with this invention. The invention of course pertains only to nitrogen bases which form aqueous and non-aqueous phases with water, the invention being caried out under conditions such that this state of insolubility or substantial insolubility exists. In some instances it will be desirable to add a hydrocarbon to a soluble nitrogen base to render it insoluble or slightly insoluble. In addition the more basic nitrogen base must be at least as water-soluble as the less basic compound (so that solubilities and pH values will be in the same direction). By nitrogen bases I mean compounds such as aliphatic and aromatic amines, quaternary ammonium salts wherein the nitrogen is of the quinquevalent type and heterocyclic compounds having hetero N-atoms which may be considered organic substitution products of ammonia. The invention is applicable for the separation not only of aliphatic and aromatic amines, octylamine, hexylamine, aniline derivatives, etc. but of pyridine derivatives, quinoline derivatives, piperidine derivatives, carbazole derivatives and the like. The invention is particularly applicable for the separation of readily polymerizable compounds such as methylvinylpyridine from methylethylpyridine. In fact the acid employed herein does not have the pronounced catalytic effect in polymerization exhibited by stronger acids.

As indicated carbon dioxide dissolved in water to form the solvent employed according to this invention will form a raffinate and an extract richer in their respective components than the feed on a solvent-free basis. Normally sufficient carbon dioxide is dissolved in water to insure a desired solubility level, say sufficient so that at least twice as much of the mixture of nitrogen bases dissolves in the solution as would dissolve in the water in the absence of carbon dioxide. A convenient method of keeping sufficient carbon dioxide in solution is to operate with water saturated or almost saturated under operating conditions which will depend primarily upon the extent of solubility of nitrogen bases to be separated, say a temperature of from 40° F. to 200° F. and a pressure of from 50 to 400 pounds per square inch gauge.

This invention will be more readily understood by reference to the accompanying drawing. In the accompanying diagrammatic drawing reference to some equipment such as gauges and other equipment which would be necessary to actually operate the process have been omitted. Only sufficient equipment to illustrate the process has been shown and it is intended that no undue limitation be read into the invention by reference to the drawing and discussion thereof.

The figure in the accompanying drawing is a schematic representation of one method of carrying out the instant invention.

Referring now to drawing, the feed stock, for example, a mixture of nitrogen bases having different pH values (e. g. ethylpyridine and vinylpyridine) to be separated, is fed through 1 to an intermediate point of a conventional liquid-liquid multistage countercurrently contacting extractor A. Within extractor A the feed is contacted with an acidic aqueous phase which is formed by dissolving carbon dioxide in water. The heavier aqueous phase selectively dissolves the more basic component (ethylpridine) as it contacts the feed in passing through the column to form an extract richer in the more basic compound on a solvent-free basis than the feed. The extract is withdrawn through line 8 at the bottom of the extractor. The solution flowing through line 8 can be heated before or after passing through an expansion valve *a*. The solution from line 8 flows into a separator C which generally operates at a lower pressure than the extractor. By maintaining the proper conditions on this separator enough carbon dioxide will be released from solution to cause formation of two phases in separator C, one water-rich phase and one rich in organics. The acidity is reduced to form sufficient organic phase to provide all or a portion of the reflux for extractor A. Reflux leaves the separator through line 9, passes through a pump *b*, through line 10 and then line 11 to the bottom of extractor A. The aqueous phase from separator C passes through line 12, through an expansion valve *c*, is admixed with the stream from line 17 and passes through line 13 to a separator D which usually operates at a pressure near atmospheric or perhaps subatmospheric to provide for release of carbon dioxide. Due to release of carbon dioxide a non-aqueous phase and an aqueous phase will form in this separator. It will be understood, however, that vessels C and D can be operated at the high pressures prevailing in the system and the carbon dioxide liberated by the use of heat. Suitable pumps and pressure control means will, of course, be installed. The use of heat alone to liberate carbon dioxide from solution will reduce compressor requirements. The aqueous phase is pumped through lines 14 and 15 to a reboiled stripping column B which operates at a pressure a little higher than separator D. In this stripper the remaining carbon dioxide and organics are separated from the aqueous phase. The vapor product passes through line 16 to a condenser *d* where the water and organics are condensed. The product leaves the condenser by means of line 17, passes through line 13 to separator D. The organic phase from separator D, richer in the more basic component (ethylpyridine) than the feed, is removed through line 25. If more reflux is needed in extractor A than is separated in separator C, part of the organic phase from line 25 passes through line 26, through a pump *e*, through line 28 to line 11 where it joins organics from line 10 as reflux for the extractor. The remaining organic phase from separator D is passed through line 27 to storage or further purification if desired. The bottoms from stripper B will be water plus any nonvolatile impurities that may have accumulated. It is passed through line 18, through a cooler *f* to a pump *g*, thence through lines 19, 21 and 23 from which it passes to line 24. Some water may be discarded to waste through line 20 to keep non-volatile impurities at a tolerable level. Make-up water is added through line 22.

The organic phase of raffinate, richer in the less basic nitrogen base (e. g. vinylpyridine) than the feed on a solvent-free basis, leaves extractor A through line 2, thence through a pump *h* to line 3. This raffinate from line 3 can then be separated from solvent but preferably will be mixed with water and carbon dioxide from line 24 and passed through line 4 into a mixer E. Coolers will be needed before, after or within the mixer to remove heat of combination and to adjust the mixture temperature to the proper level for operation of extractor A. The mixture then passes through line 5 to a separator F. The aqueous phase, saturated with carbon dioxide and dissolved organics at the conditions held on the separator, passes through line 7 to enter the top of the extractor as the selective solvent. The non-aqueous phase richer in the less basic nitrogen base (e. g. vinylpyridine) than the feed leaves the separator by line 6 as the other product of the separation. Other purification steps, not shown, can be used if desired to produce a satisfactory finished product. Gaseous carbon dioxide is collected from all three separators by means of lines 29, 30 and 32 and is passed by means of lines 31, 33 and 35 to a compressor. Make-up carbon dioxide enters through line 34. After compression, the carbon dioxide passes through line 36 to a cooler, thence through line 37 to line 24 where it is combined with the recycle water entering by line 23. The conditions (temperature and pressure) held on separator F determine the acidity of the solvent used in the extractor. These conditions should be varied to fit the nature of the feed stock, the degree of separation desired, cooling water temperatures and other practical considerations. Conditions on separator F should be such, i. e., lower pressure and/or higher temperature than extractor A, that formation of a vapor phase within the extractor is prevented. The temperature within extractor A will normally increase from top to bottom, providing all streams entering the contactor are at or near the same temperature. However, this temperature gradient can be reversed if desired.

The following example and data readily illustrate the use of carbon dioxide in water for separating pyridines of different basicity (methylethylpyridine and methylvinylpyridine) in an extraction column. To simulate operating conditions within a section of an extraction column feed was introduced in the bottom of a column and measured amounts of water and feed were added respectively to the feed and the solvent to make them about saturated when carbonated at 200 p. s. i. g.

EXAMPLE

To make mixtures of pyridine compounds for feed and for addition to the solvent relatively pure methylethylpyridine and methylvinylpyridine were blended together. The solvent (S in the table which follows) was water, containing 2.05 weight per cent based on the total of a mixture of pyridines and carbonated at 200 p. s. i. g. and 70° F. The composition of the mixture of pyridines in the solvent S was 75 weight per cent methylvinylpyridine (MVP in the table following) and 25 weight per cent methylethylpyridine (MEP in the table which follows). The feed (F in the table following) was a mixture of pyridines containing 13.0 weight per cent water based on the total and carbonated at 200 p. s. i. g. and 70° F. The composition of the mixture of pyridines in the feed F was 20 weight per cent methylvinylpyridine MVP and 80 weight per cent methylethylpyridine MEP. Countercurrent extractions were made in a 2-inch diameter, 8-foot tall, steel, spray column. The pyridine feed was dispersed through a 3/128 inch diameter spray tip in the bottom of the column and the solvent was introduced in the side of the column at a point near the top. Raffinate was withdrawn at the top of the column while extract was removed from the side of the column at a point near the bottom of the column. The column was operated for one hour before taking samples and subsequently three-minute samples (time samples) were taken every half hour. The total operating time was three hours. Extract and raffinate flow rates were measured by these time samplyes and from this information feed rate and the solvent rate were determined by calculating material balances around the column. Since the compositions of the raffinate, extract, solvent and feed are known, the flow rate of solvent and the flow rate of the feed can be calculated assuming the total water entering the column to be equal to the total water leaving the column, and the total pyridines MEP and MVP entering the column to be equal to the total pyridines leaving the column. Compositions of the streams were determined by taking the refractive index (RI in the table) of solvent-free samples of the streams. In the following table are given operating conditions and results obtained by the method described in this example.

Table
COUNTERCURRENT EXTRACTION OF MEP AND MVP

Feed (F): Mixture of MEP and MVP with 13.0 wt. percent water carbonated at 200 p. s. i. g. and 70° F.
Solvent (S): Water with 2.05 wt. percent mixture of MEP and MVP carbonated at 200 p. s. i. g. and 70° F.
Column pressure: 214 to 215 p. s. i. g.
Column: 8-foot-tall by 2-inch diameter, steel, spray column with 3/128-inch diameter spray tip.

| Flow Rate, ml./min. | | | | Temp., °F. | | Volume Flow Ratio, S/F | Stream composition by RI | | | | Solubility, wt. percent pyridine in Ext. | Pyridine Balance Out/in ×100. | |
|---|---|---|---|---|---|---|---|---|---|---|---|---|---|
| | | | | | | | Wt percent MVP, Sol free basis | | | | | | |
| S | F | Ext. | Raff. | S | Ext. | | F | S | Raff. | Ext. | | MVP | MEP |
| 212.5 | 25.1 | 222 | 15.6 | 75 | 75 | 8.46 | 20 | 75 | 38.5 | 18 | 5.86 | 97.2 | 101.2 |
| 212.5 | 27.1 | 221.7 | 17.9 | 77.5 | 78 | 7.84 | 20 | 75 | 40.0 | 18 | 5.78 | 104.6 | 98.0 |
| 217.0 | 27.0 | 227.1 | 16.9 | 80 | 79 | 8.04 | 20 | 75 | 41.0 | 18 | 5.99 | 103.6 | 98.5 |

It is apparent from the table that a good separation was obtained. It is estimated that for the separation of a mixture of 40 weight per cent methylvinylpyridine and 60 weight per cent methylethylpyridine into (1) an extract containing 95 per cent methylethylpyridine and 5 per cent methylvinylpyridines, and (2) a raffinate containing 99 percent methylvinylpyridine and 1 per cent methylethylpyridine (all on a solvent-free basis), approximately 20 theoretical stages are required. It was found that a solution of carbon dioxide in water is a very desirable solvent having good solubility and selectivity. In the separation of methylethylpyridine from methylvinylpyridine water containing carbon dioxide has a selectivity factor of about 2.7 and a solubility for methylethylpyridine of about 15 per cent at 200 pounds per square inch gauge carbon dioxide pressure at 35° F. (selectivity factor being $$\beta = \frac{E_{ep}R_{vp}}{E_{vp}R_{ep}}$$

where the extract phase and the raffinate phase are in equilibrium with each other, where $E_{ep}$ is the concentration of methlylethylpyridine in extract phase, $R_{vp}$ is the concentration of methylvinylpyridine in the raffinate phase, $E_{vp}$ is the concentration of methylvinylpyridine in the extract phase, and $R_{ep}$ is the concentration of methylethylpyridine in the raffinate phase). In addition when operating according to this invention polymer formation is low and recovery is easy.

It will be noted that many advantages are obtained by operation in accordance with this invention. One advantage is that reflux can be provided by simply releasing the pressure on the extract phase from the extractor and recycling the resulting pyridine phase to the bottom of the extraction zone. This will also provide an additional equilibrium stage. By the use of separator C for obtaining reflux (instead of using a single vessel and releasing all of the carbon dioxide) reflux can be obtained which is richer in the less basic compound than the organic phase obtained if all of the carbon dioxide is released. Another advantage is that the raffinate from the extractor is passed through a mixer together with recycled and make-up water and carbon dioxide to provide the extracting medium which is fed to the top of the extraction zone. In a separator the effluent from the mixer separates into two layers, and thus also provides an additional equilibrium separation step. It is the aqueous phase from this separator which passes to the extraction zone. A further advantage is that by mixing the $CO_2$ with the makeup water in the presence of nitrogen bases a considerably lower pressure is required to provide the necessary $CO_2$ concentration in the solvent medium fed to the top of the extractor, since the solubility of carbon dioxide is considerably greater due to the presence of nitrogen bases in the aqueous phase.

It will be apparent that other embodiments of this invention can be made without departing from the spirit and scope thereof, and that I do not limit myself to the specific embodiments set forth.

I claim:

1. A process for resolving a mixture of nitrogen bases which have unsaturated substituents thereon and nitrogen bases which have saturated substituents thereon, which have different pH values, which form aqueous and organic phases with water and wherein the more basic nitrogen base in said mixture is at least as water-soluble as the less basic nitrogen base in said mixture, which comprises subjecting said mixture to solvent extraction by contacting the mixture of nitrogen bases with water having carbon dioxide dissolved therein to form a non-aqueous phase richer in the less basic nitrogen base on a solvent-free basis than the initial mixture and an aqueous phase richer in the more basic nitrogen base on a solvent-free basis than the initial mixture, withdrawing non-aqueous phase as raffinate, recovering said raffinate from solvent, withdrawing aqueous phase as extract, liberating a portion of the carbon dioxide from said extract to form a water-rich phase of said extract and a phase rich in said nitrogen bases, the last-mentioned phase of said extract providing reflux for said extraction, subsequently liberating remaining carbon dioxide from said water rich phase of said extract to form an organic phase and an aqueous phase, and recovering the last-mentioned organic phase as a product.

2. A process for resolving a mixture of alkyl pyridines and alkenyl pyridines, which have different pH values, which form aqueous and organic phases with water and wherein the more basic pyridines in said mixture are at least as water-soluble as the less basic pyridines in said mixture, which comprises subjecting said mixture to continuous solvent extraction by continuously contacting the mixture of pyridines with water having dissolved therein sufficient carbon dioxide to insure a desired solubility level, thereby forming a non-aqueous phase richer in the less basic pyridines on a solvent-free basis than the initial mixture and an aqueous phase richer in the more basic pyridines on a solvent-free basis than the initial mixture, continuously withdrawing said non-aqueous phase as raffinate, recovering said raffinate as a product, continuously withdrawing said aqueous phase as extract, lowering pressure on said extract thereby liberating a portion of the carbon dioxide from said extract to form a water-rich phase of said extract and a phase rich in said pyridines, the last-mentioned phase providing reflux for said continuous extraction, subsequently further lowering pressure on said water-rich phase of said extract to release remaining carbon dioxide therefrom thereby forming an organic phase and an aqueous phase containing only a small quantity of pyridines which are soluble in water, and recovering the last-mentioned organic phase richer than the initial mixture in the more basic pyridines as a product.

3. A process for resolving a mixture of alkyl pyridines and alkenyl pyridines which have different pH values, which form aqueous and organic phases with water and wherein the more basic pyridines in said mixture are at least as water-soluble as the less basic pyridines in said mixture, which comprises subjecting said mixture to continuous solvent extraction by continuously contacting the mixture of pyridines with water having dissolved therein sufficient carbon dioxide to insure a desired solubility level, thereby forming a non-aqueous phase richer in the less basic pyridines on a solvent-free basis than the initial mixture and an aqueous phase richer in the more basic pyridines on a solvent-free basis than the initial mixture, continuously withdrawing said non-aqueous phase as raffinate, recovering said raffinate from solvent, continuously withdrawing said aqueous phase as extract, heating said extract while reducing the pressure thereon thereby releasing a portion of the carbon dioxide from said extract to form a water-rich phase of said extract and a phase rich in said pyridines, the last-mentioned phase providing reflux for said continuous extraction, subsequently releasing remaining carbon dioxide from said water-rich phase of said extract by further application of heat and reduction of pressure thereby forming an aqueous phase therein containing pyridines to the extent of their solubility in water and an organic phase therein comprising remaining pyridines in said extract, and recovering the last-mentioned organic phase as a product.

4. A process for resolving an initial mixture of pyridine bases which have saturated substituents thereon and pyridine bases which have unsaturated substituents thereon, which have different pH values and which form aqueous and organic phases with water, and wherein the more basic pyridine compounds are at least as water-soluble as the less basic pyridine compounds which comprises subjecting said pyridine bases to continuous liquid-liquid counter-current solvent extraction with water having dissolved therein sufficient carbon dioxide to form a raffinate and an extract, said raffinate being a non-aqueous phase richer in the less basic pyridines on a solvent-free basis than the initial mixture of pyridines, said extract being an aqueous phase richer in the more basic pyridines on a solvent-free basis than the initial mixture, adjusting the temperature of and pressure on said extract in a first separation zone to liberate a portion of the carbon dioxide from said extract and form an aqueous phase and a phase rich in said pyridine compounds, the last-mentioned phase rich in said pyridines providing reflux for said solvent extraction, subsequently further adjusting the temperature of and pressure on said aqueous phase of said extract in a second separator zone to liberate additional carbon dioxide and thereby forming an organic phase and an aqueous phase, recovering the last-mentioned organic phase as a product of the process, compressing said liberated carbon dioxide and make-up carbon dioxide, mixing the compressed carbon dioxide with water and with the raffinate thereby causing said raffinate to separate into two phases, one of said phases of said raffinate being an aqueous phase richer in the more basic pyridines on a solvent-free basis than the raffinate and the other of said phases of said raffinate being a non-aqueous phase richer in the less basic pyridines on a solvent-free basis than the raffinate, passing the last-mentioned aqueous phase containing carbon dioxide to said continuous solvent extraction operation as solvent therefor, recovering the last-mentioned non-aqueous phase of said raffinate as a product of the process.

5. A process of claim 4 wherein the initial mixture of pyridine bases comprises essentially alkyl pyridines and alkenyl pyridines, the alkyl pyridines being more basic than the alkenyl pyridines.

6. A process in accordance with claim 4 wherein the initial mixture comprises methylethylpyridine and methylvinylpyridine.

7. In a process for resolving an initial mixture of an ethylpyridine and a vinylpyridine by liquid-liquid solvent extraction using a solution of carbon dioxide in water as a solvent therefor wherein an extract is formed which is richer in the ethylpyridine compounds than said initial mixture, the steps of adjusting the temperature of and pressure on the extract phase and thereby releasing sufficient carbon dioxide from said extract to cause separation of an organic phase therein in an amount sufficient to provide adequate reflux for said solvent extraction, and returning said organic phase to the solvent extraction step as reflux therefor.

8. In a process for resolving an initial mixture of an ethylpyridine from a vinylpyridine by liquid-liquid solvent extraction using a solution of carbon dioxide in water as a solvent therefor, wherein an extract is formed which is richer in the ethylpyridine than said initial mixture, the steps of subjecting said extract to reduced pressure in a first phase separation zone to form a first organic phase and a first aqueous phase therein, returning said first organic phase to said solvent extraction step as reflux therefor, subjecting said first aqueous phase to further reduced pressure in a second phase separation zone to form a second organic phase and a second aqueous phase, recovering said second organic phase as a product of the process, subjecting the second aqueous phase to heat and pressure in a reboiled stripping zone to form an overhead product comprising carbon dioxide and organic materials dissolved in said second aqueous phase, and to form a bottoms product comprising water and non-volatile impurities from said second aqueous phase, returning said overhead product to said second separation zone, and returning said bottoms product to said solvent extraction step.

References Cited in the file of this patent

UNITED STATES PATENTS

| | | |
|---|---|---|
| 1,965,828 | Fox | July 10, 1934 |
| 2,189,278 | Bailey et al. | Feb. 6, 1940 |
| 2,288,281 | Huijser et al. | June 30, 1942 |
| 2,311,134 | Schutt | Feb. 16, 1943 |
| 2,393,666 | Van der Hoeven | Jan. 29, 1946 |
| 2,486,778 | Doumani | Nov. 1, 1949 |
| 2,611,769 | Hays | Sept. 23, 1952 |